C. A. CARLSON.
SHAFT COUPLING.
APPLICATION FILED FEB. 2, 1910.
970,793.
Patented Sept. 20, 1910.
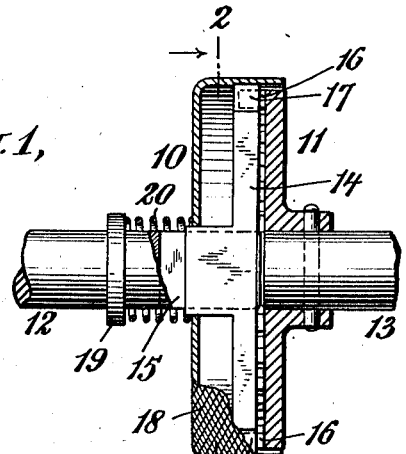
Fig. 1,
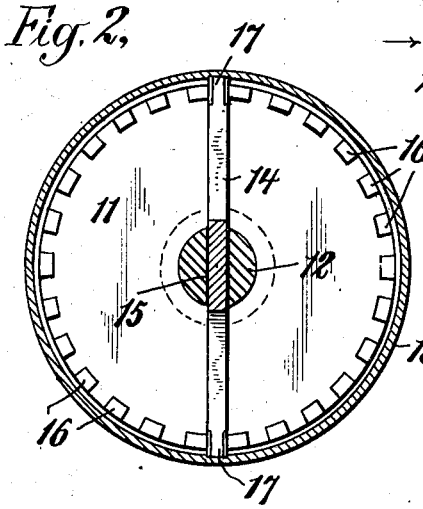
Fig. 2,
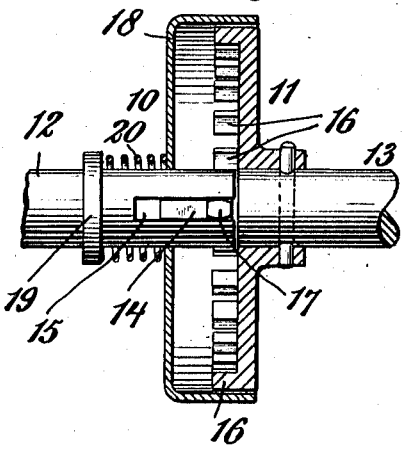
Fig. 3,
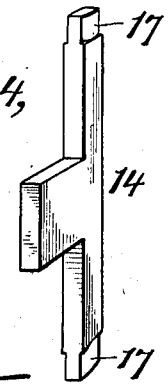
Fig. 4,
Fig. 5,
WITNESSES:
INVENTOR
Charles A. Carlson
BY
his ATTORNEYS

UNITED STATES PATENT OFFICE.

CHARLES A. CARLSON, OF BROOKLYN, NEW YORK, ASSIGNOR TO CARLSON MOTOR & TRUCK COMPANY, OF PHILADELPHIA, PENNSYLVANIA, A CORPORATION OF NEW YORK.

SHAFT-COUPLING.

970,793.  Specification of Letters Patent. Patented Sept. 20, 1910.

Application filed February 2, 1910. Serial No. 541,414.

*To all whom it may concern:*

Be it known that I, CHARLES A. CARLSON, a citizen of the United States of America, and a resident of Brooklyn, county of Kings, and State of New York, have invented certain new and useful Improvements in Shaft-Couplings, of which the following is a specification, reference being had to the accompanying drawings, forming a part thereof.

My invention relates to improvements in shaft couplings, and particularly to a form of shaft coupling permitting relative angular adjustment of the shaft members thus coupled.

My invention consists in two clutch elements connected to the shafts to be coupled, one of them being movable longitudinally upon its shaft with respect to the other, and spring pressed toward the other, the said elements being provided with portions for coengagement in different relative angular positions thereof.

My invention also consists in a certain novel construction and arrangement of parts wherein universal movements are permitted within slight limits between the coupling members, whereby the shafts may be permitted to run freely when their axes are slightly out of line with each other.

In order that my invention may be thoroughly understood, I will now proceed to describe an embodiment thereof, having reference to the accompanying drawings illustrating the same, and will then point out the novel features in the claims.

In the drawings: Figure 1 is a view in central longitudinal section through a shaft coupling constructed in accordance with my invention. Fig. 2 is a transverse sectional view therethrough upon the line 2—2 of Fig. 1. Fig. 3 is a view in longitudinal section at right angles to the plane of section of Fig. 1. Fig. 4 is a detail view in perspective of one of the coupling elements employed. Fig. 5 is a detail view in transverse section showing the engagement of the same with its complementary coupling element.

The shaft coupling comprises in general two elements 10 and 11 connected to shafts 12 and 13 respectively. The coupling element 10 includes a transverse bar 14 mounted in a longitudinal slot 15 in the end of the shaft 12, the said bar being arranged to have a sliding fit in the said slot so that it may have a limited longitudinal movement with respect to the said shaft. The coupling element 11 comprises a disk having a plurality of laterally projecting teeth 16, such teeth arranged to project in a direction parallel with the axis of the said shafts and upon the side of the disk adjacent to the element 10. The bar 14 has portions 17 at the extremities thereof arranged for coaction with teeth of the element 11 upon diametrically opposite sides thereof, as will be readily understood by reference to the drawings. The coupling element 10 includes a housing 18 which is secured fast to the bar 14 and incloses the same, and furthermore it extends beyond the said bar to a distance sufficient to inclose the periphery of the element 11. Disposed around the shaft 12 and between the rear of this casing 18 and a collar 19 upon the shaft, is a helical spring 20; the said spring tends to force the element 10 toward the element 11 whereby to retain the end portions 17 of the bar 14 in engagement with the teeth 16. The element 10 may be moved rearwardly with respect to the shaft 12 so as to disengage the parts, and then the element 10 may be angularly adjusted with respect to the element 11 whereby to angularly adjust the relation of the shafts 12 and 13 with respect to each other; then by releasing the element 10 the spring 20 will cause the reengagement of the parts and the shafts will be coupled as before. The outside of the casing 18 is conveniently knurled to permit of its ready manipulation, and it will thus be seen that the device constitutes an exceedingly simple form of angularly adjustable coupling means between two shafts, such as is inexpensive to manufacture, positive in its operation, and unlikely to get out of order.

The projections 17 of the bar 14 are preferably curved slightly in a direction parallel with the axis of the shaft, while the side faces of the teeth 16 are preferably parallel, all as will be well understood by reference to Figs. 3 and 5 of the drawings. This construction, considered in conjunction with the limited longitudinal play permitted between the portions 17 of the bar 14 and the teeth 16 of the element 11, permits of a substantially universal movement between the two shafts within small limits so that one shaft may be driven from the other without binding, even though their axes be not exactly in line with each other.

A shaft coupling of this kind may, of course, be applied to many uses, but it is primarily for connecting a magneto generator to the shaft of an internal combustion engine employed in motor vehicles. The generator being made as a separate part from the engine is often mounted slightly out of line with a portion of the engine with which it is arranged in driving relation, and the slight flexibility permitted is very useful in preventing the generator shaft from binding and the parts from badly wearing. The angular adjustment provided for permits of the generator being properly timed in relation to the engine in a simple manner, and it permits of the same being readjusted or retimed at any time by the mere retraction by hand of the element 10 and the movement thereof to its proper position with relation to the element 11.

What I claim is:

1. The combination with two shafts, of a coupling therefor comprising two elements secured fast to the shafts respectively but movable longitudinally the one with relation to the other, one of the said elements comprising a transversely disposed bar and a cylindrical casing secured thereto, and the other a disk provided with a plurality of annularly disposed teeth for engagement with the opposite extremities of the said bar; and a spring for pressing the two said elements together.

2. The combination with two shafts, of a coupling therefor comprising an element adapted to be secured fast to one of the said shafts and provided with a plurality of annularly disposed teeth, another element comprising a bar arranged to be mounted in a longitudinal slot in the other shaft whereby the said bar will turn with the shaft but will be permitted a longitudinal movement with respect thereto, the extremities of the said bar being adapted for engagement with the teeth of the first said element, the said bar being provided with means whereby it may be moved longitudinally of the shaft, by hand, from the exterior of the device, and a spring for pressing the said bar toward the first said element.

3. The combination with two shafts, of a coupling therefor comprising an element adapted to be secured fast to one of the said shafts and provided with a plurality of annularly disposed teeth, another element comprising a bar arranged to be mounted in a longitudinal slot in the other said shaft whereby the said bar will turn with the shaft but will be permitted a longitudinal movement with respect thereto, the extremities of the said bar being adapted for engagement with the teeth of the first said element, and a cylindrical housing secured to the said bar and extending over the first said element, and a spring for pressing the second said element toward the first said element.

4. The combination with two shafts, of a coupling therefor comprising two elements secured fast to the said shafts, respectively, but movable longitudinally, the one with relation to the other, one of the said elements including a plurality of annularly disposed teeth having their opposite sides parallel with each other, and the other a transverse bar provided with curved faced extremities for engagement with the parallel sides of the said teeth, thereby permitting slight relative angular axial movements but retaining driving relation in both directions of rotation.

5. The combination with two shafts one of which is provided with a longitudinal transverse slot, of a coupling for the said shafts comprising an element adapted to be secured fast to one of the said shafts and provided with a plurality of annularly disposed teeth having parallel side faces, another element comprising a bar arranged to be mounted in the slot in the other said shaft whereby the said bar will turn with the shaft but will be permitted a longitudinal movement with respect thereto, the extremities of the said bar having lateral curved faces adapted for co-engagement with the teeth of the first said element, and a spring for pressing the two said elements together.

6. The combination with two shafts one of which is provided with a longitudinal transverse slot, of a coupling for the said shafts comprising an element adapted to be secured fast to one of the said shafts and provided with a plurality of annularly disposed teeth, having parallel side faces, another element comprising a bar arranged to be mounted in the slot in the other said shaft whereby the said bar will turn with the shaft but will be permitted a longitudinal movement with respect thereto, the extremities of the said bar having lateral curved faces adapted for co-engagement with the teeth of the first said element, and a housing for inclosing the said bar and having a portion arranged to extend over the first said element, and a spring for pressing the two said elements together.

CHARLES A. CARLSON.

Witnesses:
 D. Howard Haywood,
 Lyman S. Andrews, Jr.